United States Patent [19]

Baker et al.

[11] 3,898,099

[45] Aug. 5, 1975

[54] HYDROPHILIC ELECTRODE AND METHOD FOR MAKING THE SAME

[75] Inventors: Bernard S. Baker; Martin G. Klein, both of Brookfield, Conn.

[73] Assignee: Energy Research Corporation, Bethel, Conn.

[22] Filed: Mar. 18, 1974

[21] Appl. No.: 451,881

[52] U.S. Cl. ............................... 136/75; 136/120 R
[51] Int. Cl. ............................................ H01m 35/18
[58] Field of Search ............ 136/75, 120 R, 120 FC, 136/20, 24, 31, 29, 35, 86 D

[56] References Cited
UNITED STATES PATENTS

| | | | |
|---|---|---|---|
| 3,184,339 | 5/1965 | Ellis | 136/75 |
| 3,407,096 | 10/1968 | Landi | 136/120 FC X |
| 3,536,537 | 10/1970 | Solomon | 136/120 R |
| 3,706,601 | 12/1972 | Strier et al. | 136/20 |

*Primary Examiner*—Anthony Skapars
*Attorney, Agent, or Firm*—Watson Leavenworth Kelton & Taggart

[57] ABSTRACT

Battery electrode structures comprise unsintered polytetrafluoroethylene and active material wherein the polytetrafluoroethylene constitutes from 0.1 to 3 percent of the combined weight of the polytetrafluoroethylene and the active material. The structures are formed from a blend including dry powdered polytetrafluoroethylene and active material.

2 Claims, No Drawings

HYDROPHILIC ELECTRODE AND METHOD FOR MAKING THE SAME

FIELD OF THE INVENTION

This invention relates to hydrophilic electrode structures for battery use and to methods for making the same.

BACKGROUND OF THE INVENTION

In its efforts to satisfy the somewhat divergent functions of both supporting active material and yet exposing as much active material as possible to an electrolyte the battery art has adopted numerous electrode structures and compositions, for example, electrodes in which the active material of zinc or cadmium is electroplated on a sponge material substrate, electrodes formed by pressing into bonded relation finely divided active material of manganese dioxide, mercuric oxide and silver oxide under high pressure, electrodes formed by high temperature sintering of finely divided material of nickel and silver and electrodes involving electrochemically inert binders for supporting finely divided active material. Electrodes of the last-mentioned category are particularly desirable in that they involve simpler electrode manufacturing techniques.

While those involved in the development of fuel cell electrodes have extensively investigated the use of binders such as polytetrafluoroethylene for supporting active material, the disparate functional characteristics of fuel cell and battery electrodes may be responsible for the limited prior art investigation of polytetrafluoroethylene as a battery electrode binder. Battery electrode are of course required to be hydrophilic in functional character, providing for ready diffusion of liquid electrolyte throughout the electrode active material. In contrast, a functional characteristic essential to fuel cell electrodes is hydrophobicity. Thus, while gas permeable to a high degree at one side thereof to permit contact between the electrode and fuel, the fuel cell electrode is desirably waterproofed such that electrolyte contacting the electrode at its other side cannot flow through the electrode.

Polytetrafluoroethylene is widely disclosed as such a waterproofing agent, disclosure being published, for example, in U.S. Pat. Nos. 3,457,113, 3,407,096, 3,306,779. The methods disclosed in the referenced patents involve the use of an aqueous dispersion of polytetrafluoroethylene and, in pursuit of hydrophobicity, the patents contemplate usage of relatively large amounts of polytetrafluoroethylene in weight relation to the active material of the electrode.

Patents known to applicants herein to disclose the use of polytetrafluoroethylene in battery electrodes include U.S. Pat. Nos. 3,184,339 and 3,536,537. The former patent proposes the use of non-conductive plastic binders which are rendered conductive by chemical modification of their molecular structure or by the presence therein of conductive carbon. Such conductive plastic, e.g., polytetrafluoroethylene, is admixed with active material and the mixture is then fabricated into sheet form by molding under pressure at sintering temperatures. In the latter patent, polytetrafluoroethylene is used to provide a degree of hydrophobicity in a battery electrode, analogous to fuel cell electrode use of polytetrafluoroethylene, to increase the gas recombination capability of the battery and hence diminish the rate of battery internal pressure development. A dispersion of polytetrafluoroethylene is used and is mixed with particulate active material after which the mixture is molded at sintering temperatures.

SUMMARY OF THE INVENTION

This invention has as an object thereof the provision of electrode structures for battery use employing polytetrafluoroethylene as a binder for the electrode active material.

Another object of the invention is to provide methods for the manufacture of such electrode structures for battery use.

In the efficient attainment of the foregoing and other objects, the invention provides a hydrophilic electrode comprised of unsintered electrically insulative polytetrafluoroethylene and active material supported by said polytetrafluorethylene, the polytetrafluoroethylene constituting from 0.1 percent to no more than 3 percent of the combined weight of the polytetrafluoroethylene and the active material. Such hydrophilic electrode is made by blending a quantity of powdered active material with powdered polytetrafluoroethylene in an excess of non-aqueous lubricant to form a homogeneous mixture, the polytetrafluoroethylene constituting from 0.1 percent to not more than 3 percent of the combined weight of the active material and the polytetrafluoroethylene, by removing a preselected portion of the lubricant from the mixture to form a filtered mixture, by subjecting the filtered mixture to shearing forces effecting thickness reduction thereof while maintaining the filtered mixture at temperatures below the sintering temperature of polytetrafluoroethylene, thereby forming a sheet of fibrillated polytetrafluoroethylene containing active material and lubricant, and removing the remaining lubricant from the sheet while maintaining the sheet at temperatures less than the polytetrafluoroethylene sintering temperature.

The foregoing and other objects and features of the invention will be evident from the following detailed description of preferred practices of the methods of the invention followed by examples thereof.

DESCRIPTION OF PREFERRED PRACTICES AND EXAMPLES

Powdered active material is blended with dry powdered polytetrafluoroethylene in a weight percent range of from 0.1 to 3 percent by weight with about 100–900 percent by weight excess lubricant. Examples of suitable lubricants are mineral spirits, Stoddard solvent, propylene glycol or Shell sol B (a petroleum solvent having a gravity of 70.8 API, an aniline point of 129°F., and a composition by volume of 65.5% paraffins, 32.0% naphthene, and 2.5% aromatics). This provides a homogeneous mix of the lubricant, powdered active material, and powdered polytetrafluoroethylene. The necessary amount of lubricant is about 50–90 percent by weight of the total weight of blended solids. Excess lubricant is used for blending purposes to assure a uniform mixture. The slurry can then be filtered, for example, in a Buchner or centrifugal filtration apparatus to remove a preselected portion of the lubricant working fluid to reduce the excess to the desired amount. This filtered mix or cake is then kneaded in a planetary-type blender at temperatures between room temperature and 200°F. At this point, the lubricant represents 25 to 50% of the total mixture, preferably 35–40%.

The resulting filtered mix, still containing 35–40% lubricant, is then milled between calender rollers having a gap distance, for example, of about three-eighths of an inch, depending upon the desired final size of the electrode. The extruded cake is then folded and again passed through the rollers. This practice of folding and then extruding is repeated until the extruded strip can support itself without breaking. Since in the form of the very fine fibers the polytetrafluoroethylene is flexible, the slight shearing action of the rollers and the resulting pressure form a cohesive slab. Five or six passes through the calender rollers is generally sufficient. With gaps wider than about one-half inch, more passes are necessary. It is easily seen after each pass whether the extruded material is rigid enough to support itself without breaking. The extruded material can merely be placed vertically on a rigid support to see whether the material remains rigid or whether it begins to buckle and thereby break. The slab can then be passed through the calender rollers with progressive size reductions to make a continuous porous sheet of the desired thickness in which the electrode active materials are bound by polytetrafluoroethylene.

The sheet is then dried of any residual solvent which leaves it porous. Drying is carried out by conventional methods such as air drying. In drying, as in all of the foregoing steps, temperatures are maintained below the sintering temperature of polytetrafluoroethylene. The sheet may be pressed onto a foil or screen current collector in use.

As the particles of polytetrafluoroethylene contact each other in processing, shearing forces form a bond between adjacent polytetrafluoroethylene particles and further tend to fibrillate the particles into a very fine fiber, the lubricant facilitating this activity. The ultimately formed sheet consists of a lattice of very fine interconnected polytetrafluoroethylene fibers supporting the active material.

EXAMPLE 1

95.5 grams of zinc oxide, 2 grams of mercuric oxide and 2.5 grams of polytetrafluoroethylene powder are mixed with 200 cc. of mineral spirits in a Waring type blender for approximately 3 minutes. The mix is then filtered on a centrifugal type filter leaving 38 percent by weight mineral spirits after filtration. The material is then worked between a pair of rollers for approximately 5 minutes at about 100°F. The material is milled by forcing it through the rollers, refolding milled material and reprocessing it between the rollers. This is continued for five passes until the material begins to assume a set at which point further working of the material is concluded by rolling to the desired pre-pressing thickness. The material rolled to 26 mils thickness is then cut into pieces 2.375 inch × 2 inch and a silver plated copper grid material approximately 2 mils thick is sandwiched between two pieces of the above cut material. This composite is then pressed at 2,000 pounds per square inch in a pressing die resulting in a battery plate 26 mils thick. The density of this plate is approximately 41 grams per cubic inch. This plate is then tested in a nickel-zinc cell. The discharge at 2 amps is substantially constant and above 1.6 volts for about 7 AH.

EXAMPLE 2

49.50 grams of silver oxide plus 0.50 grams polytetrafluoroethylene powder are added to 250 cc. of propylene glycol and processed as in Example 1 except at 200°F. The final electrode material is rolled to a thickness of 0.5 mils. Two pieces of this material are then cut to an electrode size of approximately 2.50 inch × 4 inch. A silver expanded metal grid is sandwiched between the rolled electrode halves. The final electrode is pressed at 1500 psi to a final thickness of 12 mils. The electrode is then used in a silver oxide zinc test cell. The discharge at 12 amps is substantially constant and above 1.4 volts for about 3 AH.

EXAMPLE 3

98.0 grams of metallic silver and 2.0 grams of polytetrafluoroethylene powder are mixed in 4000 cc. of Stoddard solvent and blended as in Example 1 in a large Waring blender. The practice of Example 1 is continued until the material is rolled to a thickness of 22 mils at which it is die cut into electrodes approximately 12 inches × 4.15 inches and is pressed with a silver expanded metal grid sandwiched between layers of the above material at a pressure of 1,000 pounds per square inch. The resulting electrode has a density of 4.2 grams per cc. and is approximately 28 mils thick.

EXAMPLE 4

94 grams of cadmium oxide, 5 grams of silver powder and 1 gram of polytetrafluoroethylene powder are mixed as in Example 1. The resulting slabs are die cut to an electrode size of 3 inches × 3 inches and are pressed with a silver expanded metal grid sandwiched between two layers at a pressure of 2,000 pounds per square inch. The resulting cadmium-oxide electrode has a density of 3.1 grams per cu. cm. and is tested in a nominal 20 AM nickel-cadmium battery. The discharge at 5 amps remains substantially constant and above 1.2 volts for about 20 AH.

EXAMPLE 5

94 grams of mercuric oxide, 5 grams of graphite powder and 1.0 gram of polytetrafluoroethylene are processed as in Example 1 into slabs of materials approximately 20 mils thick. This material is then die cut to electrodes of approximately 2 inch diameter and a nickel expanded metal grid is inserted between two of the rolled sheets. This composite is then pressed at 20,000 psi to yield an electrode with the final thickness of 30 mils approximate density of 8 grams per cc. The electrode is then used in a mercury-cadmium battery. The discharge at 0.1 amp is substantially constant at above 0.8 volt for about 2½ AH.

EXAMPLE 6

592.5 grams of $CuCl_2$, 7.5 grams of polytetrafluoroethylene powder and 150 grams of graphite powder are mixed with 2800 cc. of Shell Sol B solvent for two minutes. The mixture is then vacuum extracted leaving 480 grams of solvent. The resulting cake is milled between two rollers having a gap of three-eighths inch. The material is repeatedly run through the rollers for six passes and the extruded material is folded at 90° after each pass. The resulting strip is then rolled between rollers having a gap of 0.120 of an inch and the extruded material is cut to a size of 8 inches by four feet. From that material strips are cut 5 inches by 4 feet and each of these 5 inch strips are passed through rollers having a gap of 0.040 inches. The material is then pressed at 1500 psi to a final thickness of 0.010 inches. The resulting strips are air dried at 150°F.

EXAMPLE 7

A nickel mix containing 5.33 pounds of hydrated nickel hydroxide active material with a surface area of approximately 100 square meters per gram and particle size of approximately 0.2 microns is mixed with 1.35 pounds of powdered graphite (0.5 micron av.) and 0.067 lb of dry polytetrafluoroethylene powder. The solid ingredients are mixed with organic mineral spirits and placed into a kneader. The kneader forms a uniform homogeneous mixture of active nickel hydroxide, graphite and polytetrafluoroethylene powder. The homogeneous material is removed from the kneader and is fed to a calendering mill where, after several calendering operations, the polytetrafluoroethylene powder is in the form of long continuous strands. The first calendering operation results in the production of a continuous nickel slab approximately 35 mils thick.

From this 35 mils thick material, electrodes approximately 2.75 inches × 2 inches are cut. Two of these pieces are then placed into a pressing die on either side of a nickel grid either in the form of an expanded metal screen, foil or other suitable structure and compressed. The total force is 40 tons. To facilitate removing the electrode from the die, it is pre-wrapped prior to pressing in a one mil paper layer. The final electrode after removal from the die is 0.049 inch thick including 2 mils of the wrapped paper. This corresponds to a total electrode thickness of 0.047 inch. The average density of this electrode excluding the metal grid material is 30 grams per cubic inch. A nominal capacity of this plate is approximately 1.02 ampere-hour battery. Performance of these electrodes in nickel-zinc and nickel-cadmium batteries is excellent. The voltage after discharge at 2 amperes for four hours is 1.2 volts.

EXAMPLE 8

An initial mix consists of 7.8 pounds of hydrated nickel hydroxide, 2 pounds of graphite and 0.2 pounds of polytetrafluoroethylene powder with the characteristics described in Example 7.

The electrodes are prepared as in Example 7, except in this instance, the first slabs prior to pressing are approximately 20 mils thick. Pieces of the active mix approximately 4.52 inches × 3.065 inches are then die cut. A metallic grid is inserted between two pieces. The pieces are wrapped in paper as in Example 7. The active pieces with the grid are then placed into a die and pressed at 140 tons of total force. The final electrode achieved is 23 mils thick. These plates are then assembled, 58 plates to a cell to produce a nickel-zinc battery with a nominal capacity of 80 ampere-hours with a very high rate characteristic. The performance of this cell when discharged at high rates is excellent. Approximately 75% of capacity (60 ampere-hours) is obtained to a 1.1 volt end point when the battery is discharged at a 10 C rate (800 amps).

EXAMPLE 9

In this instance the battery plates of Example 7 are die cut into round electrodes, formed at the same pressure and used as positive plates in a nickel-hydrogen battery. The performance is excellent. Over 600 cycles to 70% depth at the 2 hour rate are obtained without appreciable decay.

EXAMPLE 10

592.5 grams of $Ni(OH)_2$, 7.5 grams of polytetrafluoroethylene powder and 150 grams of graphite powder are mixed with 2800 cc. of Shell Sol liquid for two minutes. The mixture is then vacuum extracted leaving 1250 grams of cake. The resulting cake is milled between two rollers having a gap of three-eighths of an inch. The material is repeatedly run through the rollers for six passes and the extruded material is folded at 90° after each pass. The resulting strip is then rolled between rollers having a gap of 0.120 of an inch and the extruded material is cut to a size of 8 inches by four feet and each of these 5 inch strips are passed through rollers having a gap of 0.040 inches. After drying the material is then pressed at 1500 psi to a final thickness of 0.010 inches. The resulting strips are air dried at 150°F. and used in nickel-cadmium batteries.

EXAMPLE 11

In this example the final electrode mix contains by weight 1% polytetrafluoroethylene, 6% graphite and 93% nickel hydroxide. The cathode is used in a nickel-hydrogen test cell whose performance is summarized in Table 1.

Table 1

Performance After 100 Cycles at 70% Depth Discharge at C/2 rate

| Time (minutes) | Voltage (volts) |
| --- | --- |
| 0 | 1.41 |
| 12 | 1.29 |
| 24 | 1.26 |
| 36 | 1.22 |
| 48 | 1.19 |
| 60 | 1.16 |
| 72 | 1.10 |

EXAMPLE 12

50 grams of lead oxide and 0.25 grams of polytetrafluoroethylene are mixed wit mineral spirits as in Example 1 and filtered in a Buchner funnel. The filtered mix is then worked by rolling for 30 minutes to a size of about 6 inches × 5 inches. The lead oxide-polytetrafluoroethylene mix is then pressed on an expanded metal tantalum grid. A 2 inches × 2 inches piece is cut and pressed at two tons, repressed and air dried. The electrode so made is discharged against a lead anode in sulfuric acid (6N). Approximately 10mA/sq. cm. can be drawn at 2 volts and 50mA/sq. cm. at 1.75 volts.

In electrodes employing polytetrafluoroethylene powder as a binding agent for different active materials, the volume of polytetrafluoroethylene in relation to the density of the active material is a variable ratio whose determination is helpful in defining, for a particular active material, a lesser weight percentage range for polytetrafluoroethylene within the aforesaid range of from 0.1 percent to 3 percent. Thus, since lead dioxide is more dense than zinc oxide, a lesser percentage by weight of polytetrafluoroethylene may be employed in the former instance than in the latter instance, while both such weight percentages of polytetrafluoroethylene are nevertheless within the aforesaid weight percentage range of from 0.1 to 3 percent. By way of example, from 0.1 to 1 percent of polytetrafluoroethylene may be employed with lead dioxide and from 1.5 to 3 percent polytetrafluoroethylene may be employed with zinc oxide, both such lesser percentage ranges identifying the weight of polytetrafluoroethylene in relation to the combined weight of polytetrafluoroethylene and active material. Cadmium oxide is of density greater than zinc oxide but less than lead dioxide. Polytetrafluoroethylene may thus be employed in a weight percentage range of from 0.5 to 2 percent with cadmium oxide.

As shown in the foregoing examples, the blend for use in providing hydrophilic electrode structure may include plural electrochemically convertible active materials and electrically conductive fillers. The examples are intended in a descriptive and not in a limiting sense. The invention is defined in the following claims.

What is claimed is:

1. A method for the manufacture of hydrophilic electrode structure containing electrochemically convertible active material comprising the steps of:
    a. blending a quantity of powdered active material with dry powdered polytetrafluoroethylene in an excess of non-aqueous lubricant to form a homogeneous mixture, said polytetrafluoroethylene constituting from 0.1 percent to no more than 3 percent of the combined weight of said active material and said polytetrafluoroethylene;
    b. removing a preselected portion of said lubricant from said mixture to form a filtered mixture;
    c. subjecting said filtered mixture to shearing forces effecting thickness reduction thereof while maintaining said filtered mixture at temperatures below the sintering temperature of said polytetrafluoroethylene, thereby forming a sheet of fibrillated polytetrafluoroethylene containing active material and lubricant; and
    d. removing the remainder of said lubricant from said sheet while maintaining said sheet at temperatures less than said polytetrafluoroethylene sintering temperature, thereby providing said electrode structure.

2. A method for the manufacture of hydrophilic electrode structure containing electrochemically convertible active material and filler material of higher electrical conductivity than said active material comprising the steps of:
    a. blending a quantity of powdered active material, filler material of higher electrical conductivity than said active material and dry powdered polytetrafluoroethylene in an excess of non-aqueous lubricant to form a homogeneous mixture, said polytetrafluoroethylene constituting from 0.1 percent to no more than 3 percent of the combined weight of said active material, said filler material and said polytetrafluoroethylene;
    b. removing a preselected portion of said lubricant from said mixture to form a filtered mixture;
    c. subjecting said filtered mixture to shearing forces effecting thickness reduction thereof while maintaining said filtered mixture at temperatures below the sintering temperature of said polytetrafluoroethylene, thereby forming a sheet of fibrillated polytetrafluoroethylene containing active material, filler material and lubricant; and
    d. removing the remainder of said lubricant from said sheet while maintaining said sheet at temperatures less than said polytetrafluoroethylene sintering temperature, thereby providing said electrode structure.

* * * * *